Nov. 13, 1945.  G. WHITE ET AL  2,388,809
APPARATUS FOR USE IN THE TEMPERING OF GLASS
Filed Aug. 24, 1942  2 Sheets-Sheet 1

Inventors
GERALD WHITE,
DUDLEY E. GRIMES.

By Frank Grover
Attorney

Nov. 13, 1945. G. WHITE ET AL 2,388,809
APPARATUS FOR USE IN THE TEMPERING OF GLASS
Filed Aug. 24, 1942 2 Sheets-Sheet 2

Inventors
GERALD WHITE,
DUDLEY E. GRIMES.
By Frank Fraser
Attorney

Patented Nov. 13, 1945

2,388,809

UNITED STATES PATENT OFFICE 2,388,809

APPARATUS FOR USE IN THE TEMPERING OF GLASS

Gerald White and Dudley E. Grimes, Toledo, Ohio, assignors to Libbey-Owens-Ford Glass Company, Toledo, Ohio, a corporation of Ohio Application August 24, 1942, Serial No. 455,890

4 Claims. (Cl. 49—45)

The present invention relates to improvements in apparatus for use in the tempering of glass sheets or plates.

It is a primary aim and object of this invention to provide improved apparatus for supporting glass sheets during tempering whereby danger of warpage, distortion, or change of shape or contour thereof during the heating and cooling treatments will be reduced to a minimum if not entirely eliminated.

Another object of the invention is the provision of improved apparatus for supporting glass sheets during tempering and in which the sheet is freely supported on edge in an inclined position in such a manner as to overcome any tendency of the sheet to sag or warp during tempering, while at the same time permitting it to expand and contract in its own plane.

A further object of the invention is the provision of improved apparatus for supporting the glass sheets in such a manner that the glass will not be marred or defaced thereby during tempering and so constructed that it will not interfere with the heating and cooling operations.

A still further object of the invention is the provision of improved apparatus for supporting glass sheets during tempering embodying a plurality of supporting elements adjustable relative to one another to support sheets of different shapes and/or sizes as well as to compensate for wear, misalignment or deformation in the supporting means.

Other objects and advantages of the invention will become more apparent during the course of the following description, when taken in connection with the accompanying drawings.

In the drawings, wherein like numerals are employed to designate like parts throughout the same:

Figure 6:
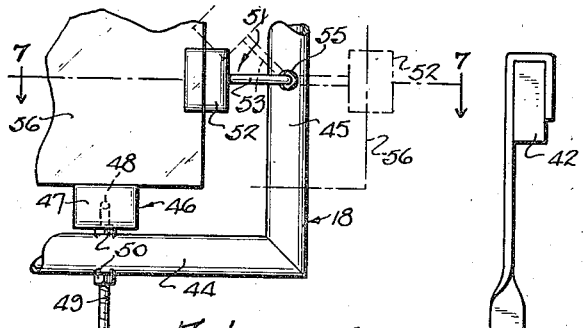
Fig. 6 is a fragmentary front view showing a modified type of mounting for the supporting elements.

In the embodiment of the invention illustrated in Figs. 1 to 5 of the drawings, glass supporting means B comprises a metal frame 18 preferably formed of a plurality of tubular members associated with one another to conform substantially to the shape and size of the glass sheet to be tempered. As herein illustrated by way of example, the frame 18 comprises the top and bottom members 19 and 20 and end members 21 and 22 associated with one another to conform substantially to the shape of a glass sheet 23 to be tempered and also bent lengthwise to conform substantially to the curvature of said sheet.

The glass sheet 23 is carried by the frame 18 in a substantially vertical position, and for this purpose the said frame is provided with a plurality of supporting elements 24 carried by the top and bottom members 19 and 20 and end members 21 and 22. Each supporting element 24 comprises a screw 25 carrying at its outer end a relatively small block 26 preferably formed of a suitable ceramic or refractory material. The block 26 is provided with a rearwardly extending opening 27 through which the screw 25 extends, and has a relatively deep countersink 28 for receiving the head 29 of the screw therein. The portion of the countersink forwardly of the screw head 29 is filled with a refractory or ceramic material 30 which bonds to the block and serves to secure the same to the screw.

Welded or otherwise suitably secured to each of the top and bottom members 19 and 20 and end members 21 and 22 of the frame and arranged transversely thereof are a plurality of spaced horizontal sleeves 31 with each of which is associated one of the supporting elements 24. More particularly, the screws 25 of the supporting elements are slideable within the sleeves 31 being secured thereto by nuts 32 and 33. Upon adjustment of the nuts 32 and 33, it will be evident that the supporting blocks 26 can be moved inwardly or outwardly relative to one another as desired.

Figure 3:
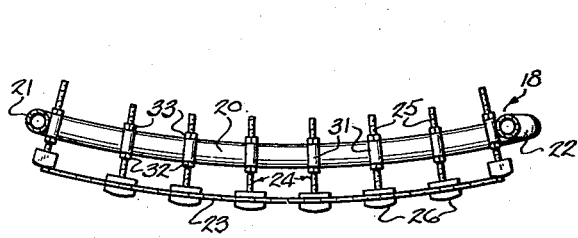
Fig. 3 is a horizontal section taken substantially on line 3—3 of Fig. 2.
Figure 5:
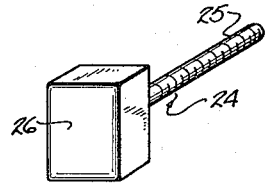
Fig. 5 is a perspective view of one of the supporting elements.
Figure 4:
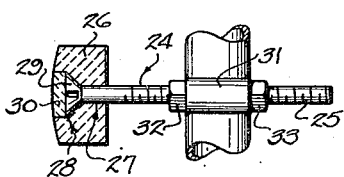
Fig. 4 is a detail vertical section through one of the supporting elements taken substantially on line 4—4 of Fig. 2.

In practice, the supporting elements 24 carried by the bottom member 20 of the frame 18 are adjusted so that they conform substantially to the horizontal curvature of the bottom edge of the glass sheet 23 as shown in Fig. 3 and the said sheet is freely supported thereupon at its lower edge. The supporting elements 24 carried by the top member 19 and end members 21 and 22 are also adjusted relative to one another to conform to the shape of the glass sheet so that when the sheet is placed upon the frame it will rest against said supporting elements. The frame is adapted to freely support the glass sheet in an inclined position in such a manner that the tendency of the sheet to sag, warp or lose its shape or contour upon heating and cooling thereof is reduced to a minimum. At the same time, the supporting means permits the sheet to expand and contract in its own plane during the heating and subsequent cooling operations so that the supporting elements do not act to in any way confine or restrict the movement of the sheet.

The means for supporting the frame 18 comprises the vertical arms 34 and 35 pivotally attached at their lower ends to the end members 21 and 22 of the frame as at 36 and 37 respectively. Secured to said end members 21 and 22 adjacent their upper ends are forwardly directed brackets 38 and 39, each having a plurality of openings 40 therein for selectively receiving a bolt 41 also passing through the respective arm 34 or 35. This arrangement serves to maintain the supporting frame at the desired angle and the angle of inclination thereof may be varied by inserting the bolts 41 through the desired openings 40 in brackets 38 and 39. The vertical arms 34 and 35 may be suspended from a horizontal supporting bar 42 carried by suitable hangers 43 and by means of which the frame and glass sheet carried thereby may be lowered into and subsequently raised from the furnace A.

The supporting blocks 26 may be formed of any suitable ceramic or refractory material.

When tempering a glass sheet the supporting elements 24 are first adjusted relative to one another as described above to conform substantially to the shape of the sheet, after which the sheet is placed upon the frame 18 so that it is freely supported at its lower edge upon the supporting blocks 26 carried by the bottom member 20, while the top and opposite end edges of the sheet rest freely against the supporting blocks carried by the top member 19 and end members 21 and 22. That is to say, the supporting elements carried by the bottom member are adjusted so that they conform substantially to the curvature of the bottom edge of the sheet and the other supporting elements are adjusted so that they all have contact with the sheet when it is placed on the frame.

The frame and glass sheet are then lowered into the furnace and heated to the desired temperature, whereupon they are lifted therefrom and, while still supported upon the frame, the sheet is subjected to jets or blasts of air from the blower heads. By freely supporting the glass sheet on edge in an inclined position in the manner herein disclosed, the sheet can be subjected to the heating and cooling operations without danger of the said sheet being accidentally displaced from the frame. In addition, the frame is of such character that it will not interfere with the proper heating and cooling of the sheet. The supporting elements are not only adjustable to take care of glass sheets of somewhat different curvatures but when tempering a large number of sheets of the same shape and size, it is possible when positioning each sheet upon the frame to individually adjust the supporting elements to make certain that they all have proper contact with the sheet. The supporting blocks 26 are formed of a material which will not injure the glass surface and should one of the supporting elements become broken, it can be readily replaced.

Figure 7:
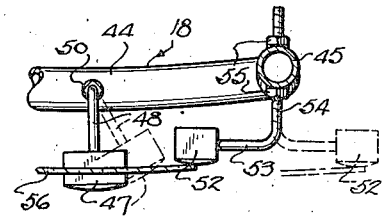
Fig. 7 is a horizontal section taken substantially on line 7—7 of Fig. 6.
Figure 1:
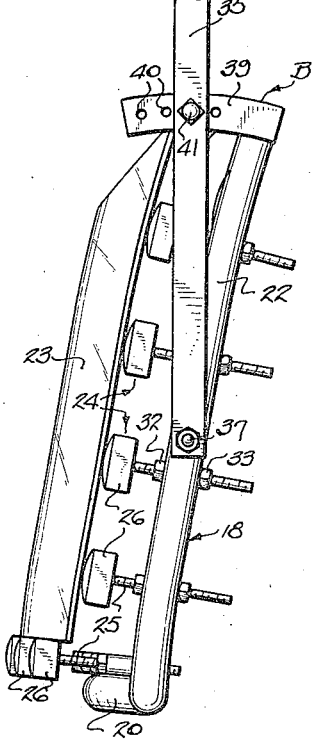
Fig. 1 is a side elevation of apparatus provided by the invention for use in the tempering of glass sheets or plates.
Figure 2:
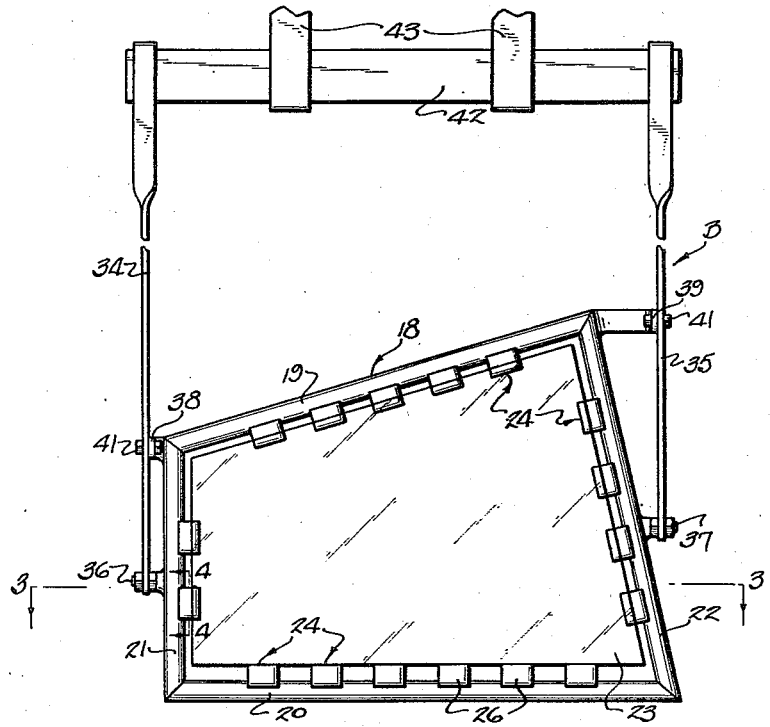
Fig. 2 is a front view thereof.

In Figs. 6 and 7 is illustrated a modified type of mounting for the supporting elements which renders them capable of adjustment to accommodate glass sheets of different sizes and also of more widely different curvatures. In these figures, the bottom member of the frame 18 is indicated at 44 and one end member at 45. The supporting elements 46 associated with the bottom member 44 include a refractory or ceramic block 47 carried by an L-shaped screw having a horizontal portion 48 and downturned threaded portion 49 which passes through the said bottom member and is secured thereto by nuts 50. The supporting elements 51 associated with the end member 45 comprises a block 52 carried by an L-shaped screw 53 having a rearwardly directed threaded portion 54 passing through the end member and secured thereto by nuts 55. In this case, the supporting elements carried by the bottom member can be swung about the vertical axis of the screws (broken line in Fig. 7) to conform to different curvatures and, likewise, the supporting elements carried by the end members can be swung about the horizontal axis of the screws from the full line position to the broken line position or to any intermediate position to accommodate glass sheets 56 of different sizes.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

We claim:

1. Apparatus for supporting a curved sheet of glass during tempering, comprising a frame formed of a plurality of members bent lengthwise to conform substantially to the curvature of said sheet, a plurality of supporting elements carried by one of said frame members and including blocks formed from a ceramic composition for supporting the glass sheet at its lower edge in a substantially vertical position, additional supporting elements carried by the other frame members and also including blocks formed from a ceramic composition against which the sheet freely rests, and means for mounting each of said supporting elements upon its respective frame member for independent adjustment toward and away from said frame member in a direction at substantially right angles to the plane of the sheet.

2. Apparatus for supporting a curved sheet of glass during tempering, comprising a frame formed of a plurality of members bent lengthwise to conform substantially to the curvature of said sheet, a plurality of supporting elements carried by one of said frame members and including blocks formed from a ceramic composition for supporting the glass sheet at its lower edge in a substantially vertical position, additional supporting elements carried by the other frame members and also including blocks formed from a ceramic composition against which the sheet freely rests, means for mounting each of said supporting elements upon its respective frame member for independent adjustment toward and away from said frame member in a direction at substantially right angles to the plane of the sheet, means for mounting said frame to turn about a horizontal axis, and means for securing said frame in an inclined position.

3. Apparatus for supporting a glass sheet during tempering, comprising a frame formed of a plurality of frame members, a plurality of supporting elements carried by one of said frame members and including blocks formed from a ceramic composition for supporting the glass sheet at its lower edge in a substantially vertical position, additional supporting elements carried by the other frame members and also including blocks formed from a ceramic composition and arranged to contact the sheet adjacent the marginal portions of its rear surface only, means for mounting each of said supporting elements upon its respective frame member for independent adjustment in two different planes, one at substantially right angles to and the other substantially parallel with the plane of the glass sheet.

4. Apparatus for supporting a glass sheet during tempering, comprising a frame formed of a plurality of frame members, a plurality of supporting elements carried by one of said frame members and including blocks formed from a ceramic composition for supporting the glass sheet at its lower edge in a substantially vertical position, additional supporting elements carried by the other frame members and also including blocks formed from a ceramic composition and arranged to contact the sheet adjacent the marginal portions of its rear surface only, means for mounting each of said supporting elements upon its respective frame member for adjusting movement in a plane substantially at right angles to the plane of the sheet and for adjusting movement in a plane substantially parallel with the plane of the glass sheet, one of said movements being a straight line movement and the other being a swinging movement.

GERALD WHITE.
DUDLEY E. GRIMES.